N. G. & T. D. ROSS.
Machine for Making Barbed Wire Cable.
No. 233,116. Patented Oct. 12, 1880.
6 Sheets—Sheet 2.
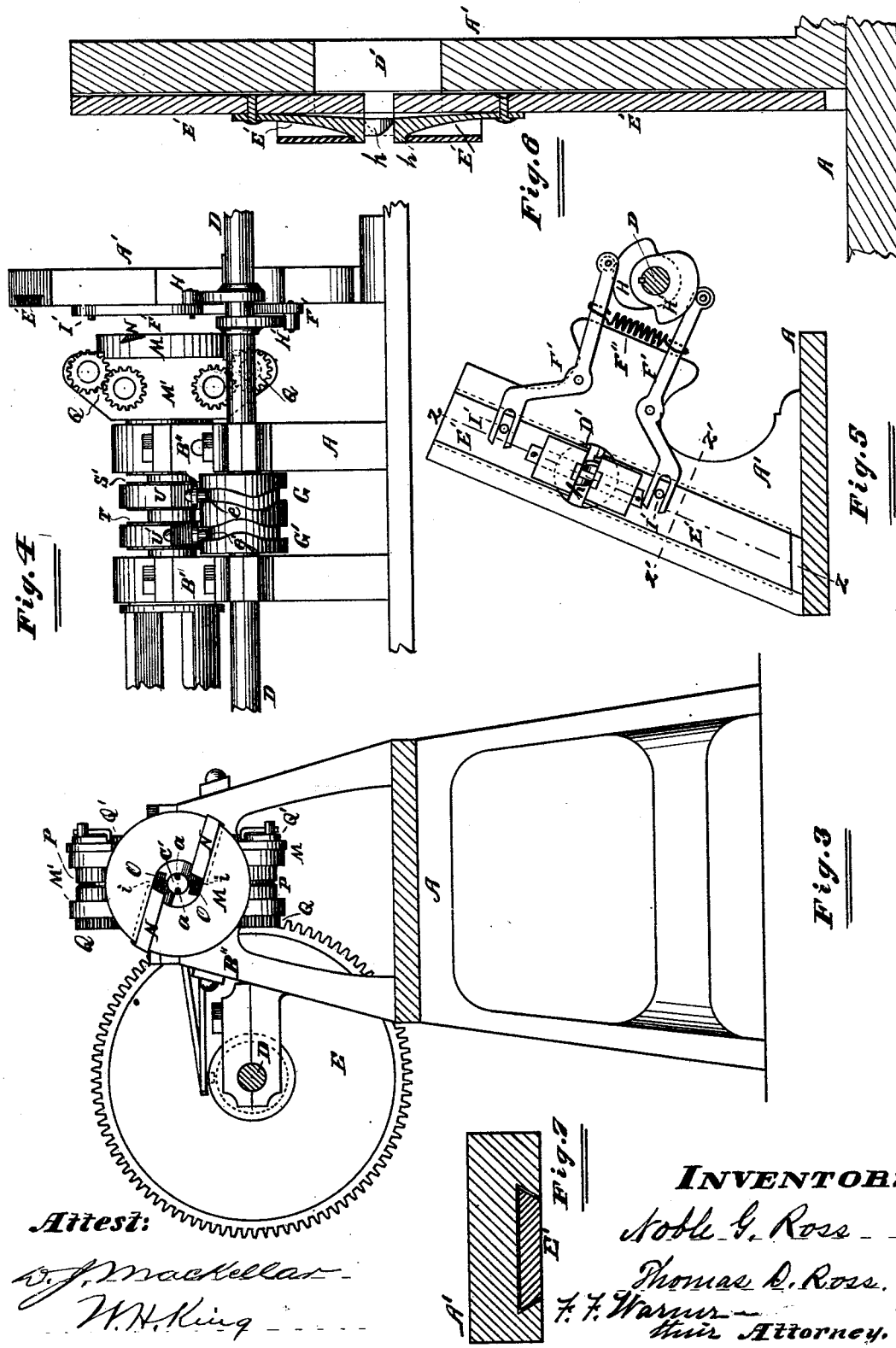
Attest:
D. J. Mackellar
W. H. King
INVENTORS:
Noble G. Ross
Thomas D. Ross by
F. F. Warner
their Attorney.

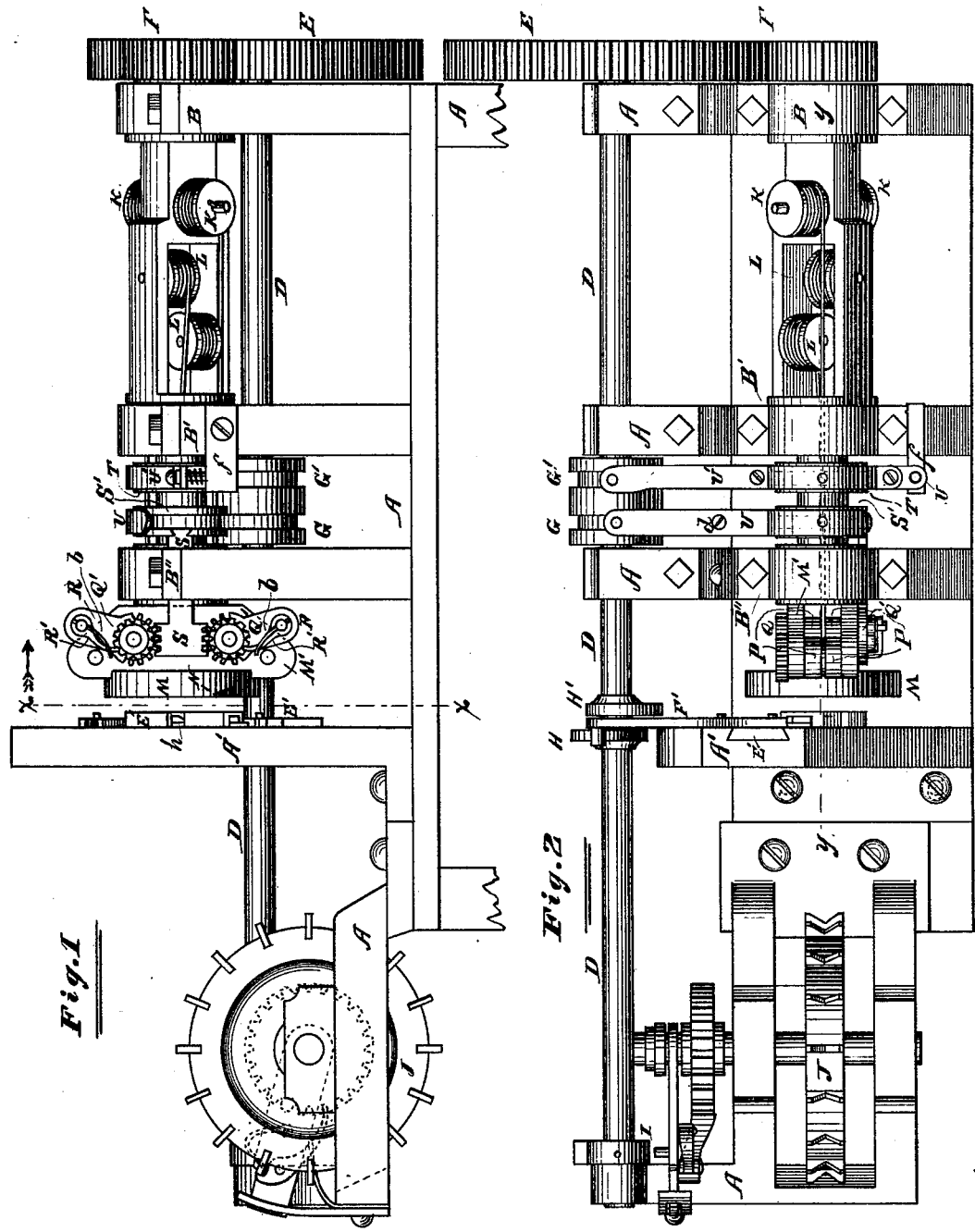

N. G. & T. D. ROSS.
Machine for Making Barbed Wire Cable.
No. 233,116. Patented Oct. 12, 1880.
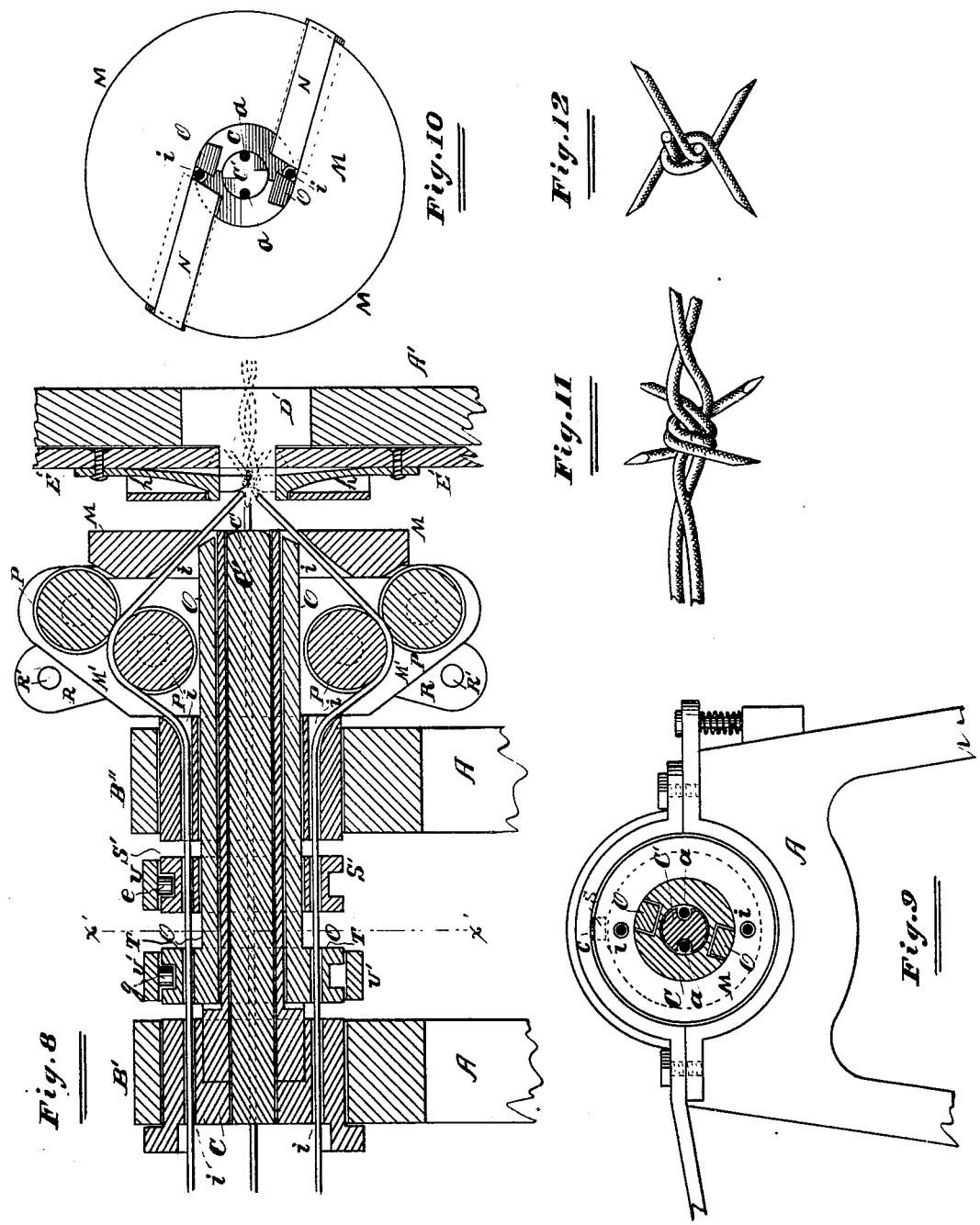
Attest:
D. J. Mackellar
W. H. King
INVENTORS:
Noble G. Ross
Thomas D. Ross
By F. F. Warner
their Attorney.

N. G. & T. D. ROSS.
Machine for Making Barbed Wire Cable.

No. 233,116. Patented Oct. 12, 1880.

Attest:
W. L. Baker
Chas H. Tallmadge

INVENTORS:
Noble G. Ross
Thomas D. Ross
By F. F. Warner, their
Attorney.

N. G. & T. D. ROSS.
Machine for Making Barbed Wire Cable.

No. 233,116. Patented Oct. 12, 1880.

6 Sheets—Sheet 5.

Attest
W. L. Baker
Chas. H. Tallmadge

INVENTORS:
Noble G. Ross
Thomas D. Ross
By F. F. Warner, their
Attorney.

N. G. & T. D. ROSS.
Machine for Making Barbed Wire Cable.
No. 233,116.
6 Sheets—Sheet 6.
Patented Oct. 12, 1880.
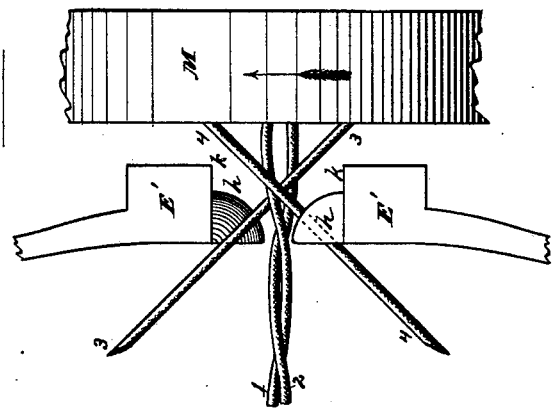
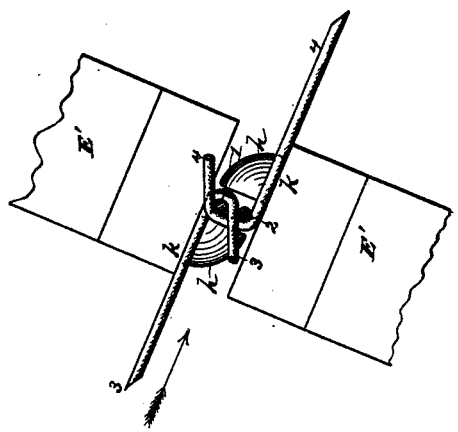
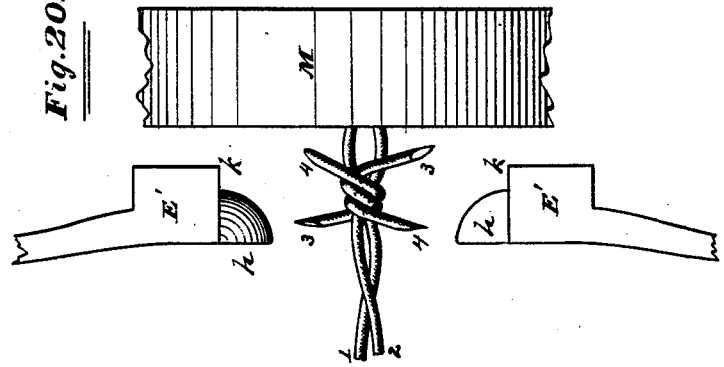
Attest:
W. L. Baker
Chas. H. Tallmadge
INVENTORS:
Noble G. Ross
Thomas D. Ross
By F. F. Warner, their
Attorney.

UNITED STATES PATENT OFFICE.

NOBLE G. ROSS, OF CHICAGO, ILLINOIS, AND THOMAS D. ROSS, OF COFFEYVILLE, KANSAS.

MACHINE FOR MAKING BARBED-WIRE CABLES.

SPECIFICATION forming part of Letters Patent No. 233,116, dated October 12, 1880.

Application filed May 3, 1879.

*To all whom it may concern:*

Be it known that we, NOBLE G. ROSS, of Chicago, in the county of Cook and State of Illinois, and THOMAS D. ROSS, of Coffeyville, in the county of Montgomery and State of Kansas, have jointly invented certain new and useful Improvements in Machines for Making Barbed-Wire Cables, of which the following, in connection with the accompanying drawings, is a specification.

Figure 13:
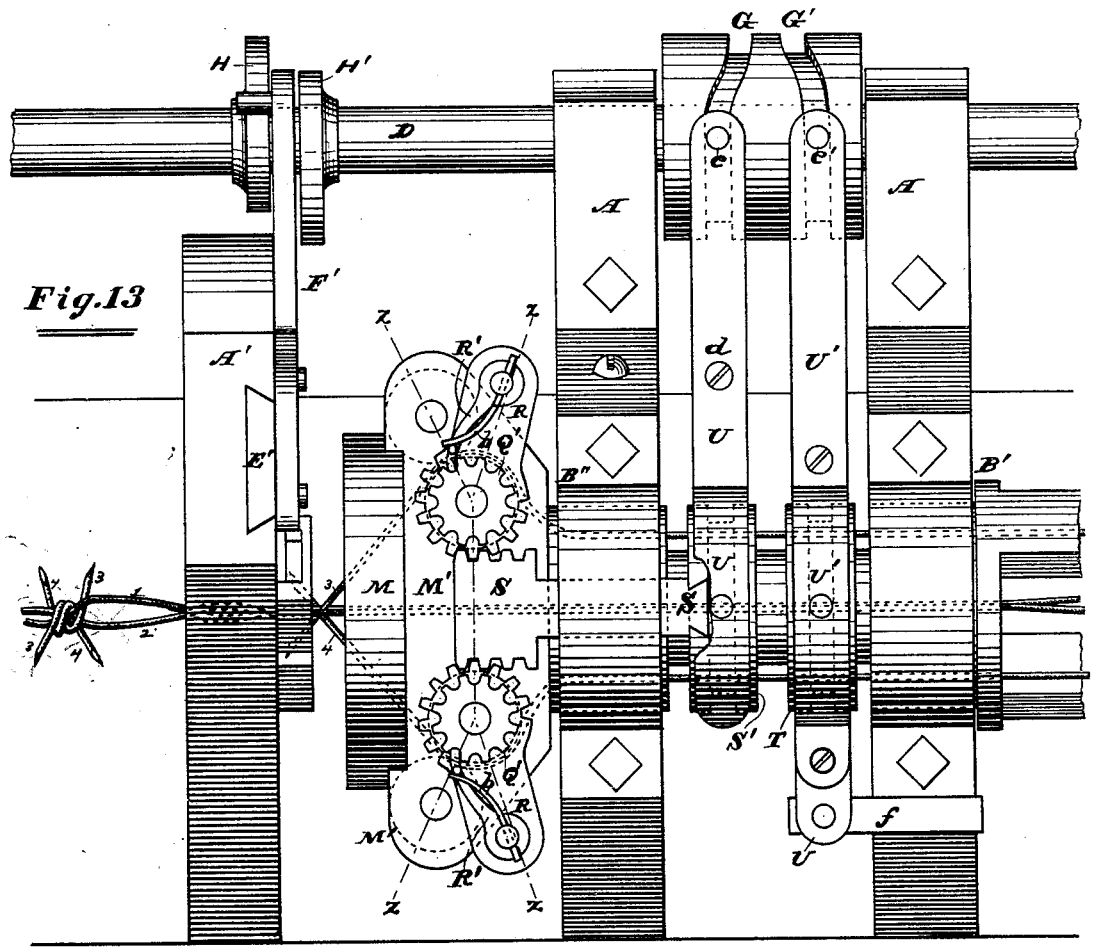
Figure 15:
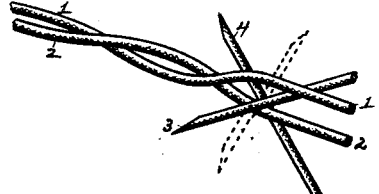
Figure 14:
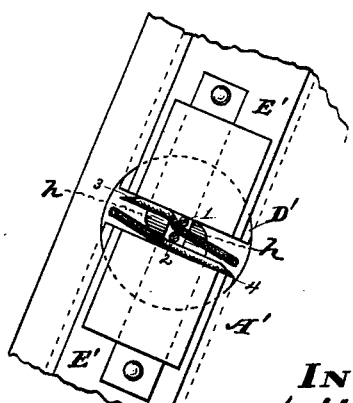
Figure 16:
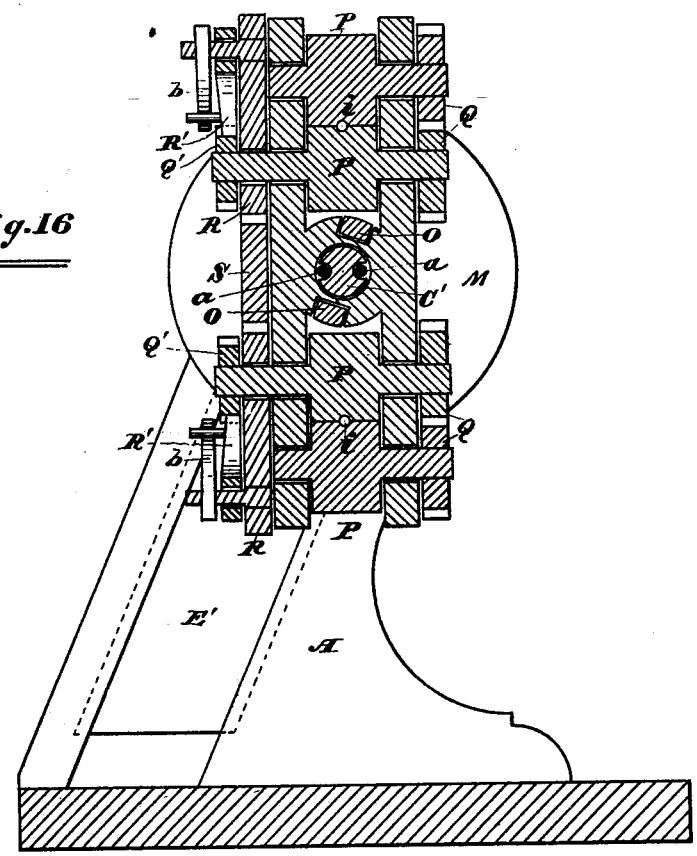
Figure 17:
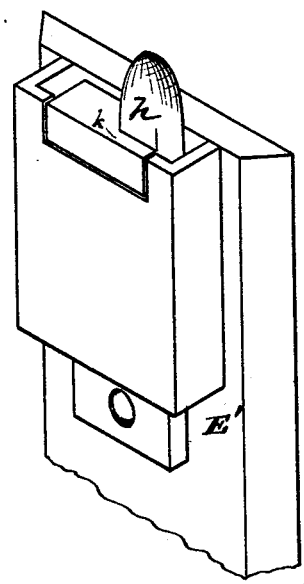

In the drawings, Figure 1 is a side elevation of a machine embodying our invention; Fig. 2, a top or plan view thereof; Fig. 3, a section in the plane of the line $x\,x$ of Fig. 1 viewed in the direction of the arrow there shown; Fig. 4, a side elevation of the central part of the machine, showing the side opposite to that represented in Fig. 1; Fig. 5, a section in the plane of the line $x\,x$, viewed in the opposite direction from that indicated by the arrow there shown; Fig. 6, a section in the plane of the line $z\,z$ of Fig. 5; Fig. 7, a section at $z'\,z'$ of Fig. 5; Fig. 8, a section in the plane of the line $y\,y$ of Fig. 2; Fig. 9, a section in the plane of the line $x'\,x'$ of Fig. 8; Fig. 10, a face view of the head of the flier. Figs. 11 and 12 are views of the barbed cable. Fig. 13 is a top or plan view of that part of the machine to which the barbed-wire feeding mechanism and the barb-prong holders are applied, showing the same upon a scale enlarged from the previous views showing the same. Fig. 14 is a face view of the barb-prong holders enlarged and detached. Fig. 15 is a perspective, showing the relative positions of the cable-strands and barb-wires just previous to the winding of the latter upon the cable. Fig. 16 is a vertical transverse section in the plane of the line $z\,z$ of Fig. 13. Fig. 17 is a perspective, upon an enlarged scale, of one of the barb-prong holders and its holder detached. Figs. 18, 19, and 20 are enlarged detail representations, showing the relative positions of the twisted cable-strands, the barb-wires, and the holders in the first, intermediate, and final steps in the operation of applying the barbs to the cables, and all of which will be hereinafter more fully described.

Like letters of reference indicate like parts.

A is the frame or table of the machine, and B, B', and B'' are bearings for supporting the flier C. D is the driving-shaft, which may be driven in any suitable manner. E is a spur-wheel on the shaft D; and F is a pinion on the outer or forward end of the flier, the said pinion and spur-wheel being arranged to engage each other, as represented.

G and G' are grooved cams on the shaft D, and H and H' are eccentric cams on the same shaft. I is a rigid finger or striker on the shaft D, for actuating intermittently a wheel, J, for drawing the twisted and barbed cable from the flier intermittently; but we here make no claim either to the wheel J or its driving mechanism. It is to be understood, however, that some means are to be employed for drawing out the twisted and barbed cable and feeding it to a reel intermittently. The shaft D and wheel J have suitable bearings, forming, by preference, a part of the frame of the machine, as shown.

K K and L L are spools carried by the flier, the spools first named containing the wires from which the barbs are produced, the barbs being double or four-pointed and the spools L L containing the strands from which the cable is made, two strands being employed for that purpose.

The forward part of the flier is tubular, but filled with a rigid plug or core, C', having therein the opposite grooves $a\,a$, the object of the rigidly-grooved plug or core being to form two openings longitudinally through the forward part of the flier with facility; but we do not here intend to restrict ourselves to any particular way of forming the said openings, though we deem that described to be the best.

The strands from the spools L L are carried separately through the openings $a\,a$.

M is the forward end or head of the flier C, and N N are two rigid knives or cutters arranged oppositely therein, but on different sides of the center thereof, and not extending to the center, as shown.

O O are sliding knives or cutters laid in longitudinal grooves, sunken in the outer part of the forward or tubular portion of the flier. The forward ends or blades of the knives O O extend to the cutting-edges of the knives N N, but may be drawn back and forth therefrom, as will hereinafter be more fully explained.

The head M carries a box, M', in which are journaled the feed-rolls P P, four in number, and arranged in pairs at each end, respectively, of the box M'. The rollers in each pair are connected to each other, respectively, by means of the gears Q Q, on one end of said rollers, and one roller in each pair is provided on its opposite end with a ratchet, Q'.

R R are segmental gears mounted loosely on the spindles of the inner rollers, P P, and R' R' are detent-pawls carried by the gears R R and held to engagement with the ratchets by means of small springs b b.

S is a double rack, and S' is a grooved sliding block on the forward part of the flier, to which block the rack S is attached. The forward part of the rack engages both the said segmental gears, all of which will appear on reference to Figs. 1, 2, 3, 4, 8, 13, and 16, and especially in the last two figures just above referred to, and the longitudinal arm of the rack lies in a groove in the forward bearing part of the flier, as indicated at c.

T is a grooved block mounted freely on the forward part of the flier, but rigidly attached to the rear portion of the knives O O.

U is a lever pivoted between its ends to a fixed support, d, and provided with pins or lugs e e on each end, one of which lugs enters the cam-groove G, and the other the groove in the block S'.

U' is a lever or yoke provided with a lug, g', entering the cam-groove G'. The opposite end of the yoke U' is pivoted to a fixed part, f; and g g are lugs extending from this yoke into the groove of the block T. As the yoke U' has more or harder work to do than the lever U, we deem it best to have it engage its block at two points and to pivot it at one end, as shown.

The mechanism for feeding forward the barb-wires consists of the parts connected to or mounted in the box M' of the rack S of the sliding block S' of the lever U and the cam G, and the operation of these parts is as follows, it being understood that the cam G is rigidly mounted on the rotary shaft D, that the block S' is loosely mounted on the flier C, and that the cam G and block S' are connected by the pivoted lever U, and that the rack S is connected to the block S', and that the head M and the parts connected thereto and the rack S and block S' are all rotated together with the flier, and that the lug e of the lever U rests freely in a groove in the periphery of the block S': During the rotation of the shaft D that end of the lever U which rests in the cam G is vibrated back and forth in the longitudinal direction of the machine, and consequently the block S', which is connected to the opposite end of the said lever freely, is moved back and forth on the flier C as a bearing, the rotation of the block S' with the flier being at the same time permitted, by reason of the connection of the block S' with the lever U in the manner already described. The rack S, being connected to and carried with the block S', is also moved back and forth during the rotation of the flier, and as the forward end of the rack engages the teeth of the segmental gears R R, these gears are rotated back and forth alternately on the spindles of the inner rollers, P P, as the segmental gears R R carry the detents R' R', which engage the spur-wheels Q' Q', rigidly mounted on the same spindles with the segmental gears. These spur-wheels are rotated always in the same direction, but intermittently, so as to rotate the rollers to which the gears Q' Q' are attached, and these rollers having upon their opposite ends the gears Q Q, which engage like gears on the outer rollers, P P, communicate their intermittent rotary motion to the said outer rollers, so that each outer roller and the next inner roller rotate intermittently in opposite directions in such manner as to carry or to feed forward intermittently the barb-wires which are placed between them, as shown, it being understood that the rollers in each pair are arranged near enough together for that purpose.

A' is a standard or portion of the frame for holding the bending mechanism.

D' is an opening in the part A', and this opening is arranged directly opposite the central part of the head M.

E' E' are sliding blocks carrying holders h h, and moving in ways in the part A'. The holders h h are beveled on opposite sides or corners, as shown, and these beveled faces are arranged to nearly meet each other when the blocks E' E' are moved toward each other; but the ends of these holders, though not meeting, pass each other, and also pass the central line of the cable, as will hereinafter more fully appear, it being understood that the fingers approach each other from opposite sides of the opening D'.

F' F' are levers pivoted centrally to the part A', and their outer ends rest, respectively, upon the cams H and H', being held thereto by means of a spring, F''. The inner ends of the levers F' F' are notched or slotted, as shown, and I' I' are pins extending into these notches from the blocks or plates E' E'.

The blocks or plates E' E' are shouldered at their lower or inner ends, as shown at k k, Figs. 14, 17, 18, 19, and 20, so that the holders h h may be said to project from one corner of the said block or plate, leaving a shoulder or extension on two sides of the said holders, as is clearly indicated in Fig. 17.

To prepare the machine for work the cable-strands should be drawn out through the opening D', thus passing between the plates or slides E' E', which do not approach near enough to each other at any time to interfere with them, it being remembered that these strands should first be passed through the openings $a$ $a$, as already stated. The holders $h\ h$ will pass near opposite sides of the cable while passing each other. From the opening D' the strands should be carried to the wheel J, and as soon as enough barbs are affixed that wheel will feed out the cable automatically, and it may be carried therefrom to a reel. The barb-wires are carried from the spools K K, through openings $i\ i$ in the flier, through openings in the blocks S' and T, between the feed-rolls P P, and out through the head M, so as to be projected in opposite directions and at an inclination from the center thereof, and between the cutters, one wire passing between the cable-strands and the other close to but outside of the cable or both cable-strands. The openings $i\ i$ take such directions as to set the projecting ends of the barb-wires at angles of forty-five degrees to the head of the flier, and the feed-rolls P P move sufficiently to carry the ends of the barb-wires outside and beyond the holders $h\ h$ and through the opening D', the holders $h\ h$ standing opposite, or nearly opposite, the intersection of the barb-wires when the feed-rolls cease to feed out the barb-wires, and so as to catch the forward or cut ends thereof and lay them down upon the cable as the latter is rotated.

It may be here stated, before describing the general operation of the machine more fully, that intermitting motion is communicated to the holders $h\ h$ in the following manner: As the shaft D is revolved the outer ends of the levers F' F', which rest on the cams H H', respectively, are moved up and down by the rotation of these cams, which are carried on the said shaft. By this means the inner ends of these levers are also vibrated, and as the same ends engage the plates E' E', which carry the holders $h\ h$, the latter are moved to and from each other. The outer ends of the levers F' F' are held to the cams H H' by means of the spring F'', and the form of the cams is such, as is clearly shown in Fig. 5, as to give an intermitting movement to the holders $h\ h$.

It may also be here stated that an intermitting forward movement is given to the knives O O, for the reason that they are adapted, as described, to slide in their bed or bearing, and are connected to the sliding block T, which is moved, by means of the lever U' and cam G in like manner as the block S' is moved, though not in the same direction, at the same time.

It should also be stated that these cutters, in moving forward, pass a considerable way beyond the head M, for the purpose hereinafter stated.

It is to be understood that the wheel E is to be rotated in the direction indicated by the arrow there shown. The flier will thus be rotated, and as all the spools are mounted thereon they will all be carried around with it. As the cable-strands pass out of the flier through separate openings, and as the outer end of the cable is prevented from being rotated, the rotation of the flier will twist the strands together after they leave the flier and before they reach the reel.

As all the openings through which the cable-strands and the barb-wires pass in the flier, respectively, do not vary their position with relation either to each other, the feed-rolls, or the cutters, the rolls and cutters will always be ready to perform their functions properly as soon as acted upon, and the barb-wires will be properly presented to the holders $h\ h$, which move in a stationary holder or frame.

When the barb-wires extend out, as described, and intersect each other between the head M and the holders $h\ h$, the rotation of the cables in conjunction with the holders will cause the barb-wires to be twisted upon the cable in the manner represented in Figs. 11, 12, and 13, and as soon as they assume this form the bent portions are severed from the remaining portions, the cable not being drawn out from the flier while either the cutters or the holders are performing their functions, and the barb-wires being cut off beveling so as to form sharp or pointed ends.

After the barbs are formed and severed the cable is drawn out from the flier to the extent of about six inches, or three twists of the cable, when the barb-wires are again fed out, formed or twisted upon the cable, and then severed, the twisting of the cable being performed continually, and feeding, forming, and severing of the barbs, and the feeding out of the cable being performed in succession or intermittingly.

The several parts of the barb-wires, or, in other words, the barbs themselves, are applied in the manner shown Figs. 11, 12, and 13, for the reason, first, that the barb-wires are arranged, as shown and described, with relation to each other and the cable-strands when the machine is made ready for work; second, because the barb-wires are fed forward until they intersect each other, one passing between the cable-strands; third, because the holders $h\ h$, in performing their functions, move toward the projecting ends of the barb-wires and lay them back in, or approximately in, the position indicated by the dotted or broken lines in Fig. 15, and by the full lines in Fig. 19, and so that these ends or prongs will be caught by the shoulders $k\ k$, as shown in Figs. 14 and 19, and bent down upon and around the cable; and, finally, because the cable-strand cutters or knives O O then sever those strands, and, in moving farther forward, set or push forward the severed ends or prongs so cut, it being remembered that the flier rotates continually, and that the barb-feeding, barb-severing, and barb-holding mechanisms are actuated intermittingly and so as to perform these several steps in their proper order, and that the cable, after severing each barb, is fed forward until the barb-applying mechanism is again ready to perform its functions. The intermittent rotation of the wheel J is also caused by the rotation of the driving-shaft.

As will be perceived, the prongs of each barb stand at, or nearly at, right angles to each other, and extend in opposite directions.

We have shown on Sheet 6 three separate views in detail, the first of which, or Fig. 18, is intended to represent the relative positions of the twisted cable-strands, the barb-wires, and the holders h h at the time the barb-wires have been fed out, as described, from the head M sufficiently to be held by the holders when the latter have approached each other sufficiently for contact with the projecting ends of the barb-wires, and hence sufficiently to begin the act of bending the projecting ends around the cable during the rotation of the flier in the direction indicated by the arrow there shown. This figure may be said to represent the first step toward bending the barb-wires about the cable. In the second of said figures, or in Fig. 19, the position of the barb-wires with relation to each other, the cable-strands, and holders is represented as changed, which change has occurred for the reason that the head M is presumed to have moved a part of a revolution, while the holders have at the same time moved down to, or nearly to, their closest position with relation to each other, the holders h h thus crowding the projecting or free ends of the barb-wires back toward the head M, and bringing those parts of the barb-wires in contact with the shoulders k k, so that the continued rotation of the flier and cable will cause the ends of the barb-wires to be laid down around the cable. The last of said figures, or Fig. 20, which represents the completion of the act of applying the barbs to the cable, shows the holders h h far enough apart to allow the completed barb to be fed forward with the next intermittent forward movement of the cable, it being understood that by the time the bending of the barbs was completed the knives O O were thrust out, in the manner described, far enough to sever the barb proper, or the completed barb, from those parts of the barb-wires lying behind the said knives, and far enough to push the severed ends of the barb slightly toward the holders.

It should be understood that while the holders h h were moving from each other the cable was also being rotated, and hence that the barb shown in Fig. 20 does not occupy exactly the same position that it did before the holders began to separate. The barb there shown is also represented as having commenced its forward movement.

It should also be remembered, in order that Fig. 18 may be correctly understood, that the upper holder there shown is nearer to the observer than the other, and hence that the barb-wires pass outside of but not between the inner or flat faces of the holders h h. In other words, the holders, as shown in Figs. 18 and 20, are viewed in the direction represented by the arrow shown in Fig. 19.

To further facilitate the understanding of the figures shown on Sheet 6, we have numbered each wire with the same number, respectively, in all the said figures, Figs. 1 and 2 representing the cable-strands and Figs. 3 and 4 the barb-wires, the wire 3 passing between the cable-strands and the wire 4 outside thereof, as shown.

Having thus described our invention, what we claim as new, and desire to secure by Letters Patent, is—

1. In a machine for making barbed-wire cables, the combination, substantially as described, of a flier or strand or cable twister, carrying the cable-strand spools and the barb-wire spools, and of barb-holders, in connection with means for rotating the flier continuously, and for actuating intermittingly the holders, barb-wire cutters, and the feed mechanism, for the purposes set forth.

2. In a machine for making barbed-wire cables, a flier or cable-twister carrying the cable-strand spools, the barb-wire spools, the barb-wire cutters, and the barb-wire feeder, and having therein separate passages for each wire, all combined with each other, with barb-holders, and cable-feeding mechanism, and with means for rotating the flier continuously and for actuating the feed-mechanism, holders, and cutters intermittingly during the rotation of the flier, substantially as and for the purposes specified.

3. The combination, in a machine for making barbed-wire cables, of the flier O, carrying the spools K and L, and the blades N N and O O, with means for feeding out the wires and for actuating the blades O O back and forth intermittingly during the rotation of the flier, substantially as and for the purposes specified.

4. The combination, substantially as described, in a machine for making barbed-wire cables, of the flier O, holding-spools for the cable-strands and barb-wires, and adapted for conducting out the said stands and wires, the barb-wire feed mounted on the flier and consisting of the rolls P P, gear Q Q, ratchet-wheels Q' Q', toothed detent-carriers R R, detents or pawls R' R', and rack S, all arranged substantially as described with relation to each other, and means for actuating the said rack intermittingly during the rotation of the flier, for the purposes set forth.

5. The combination, substantially as described, in a machine for making barbed-wire cables, of the flier O, carrying the spools K and L and the cutters N and O, and having therein the channels or ways a a and i i, of the slides E' E', having thereon the holders h h, arranged substantially as described with relation to each other, to the said slides, and to the head of the flier, all in connection with feeding mechanism and means for rotating the flier continuously, and for actuating the feed, the cutters, and the said holders intermittingly during the rotation of the flier, for the purposes set forth.

6. The combination, substantially as described, in a machine for making barbed-wire cables, of the driving-shaft D, carrying the wheel E, cams G, G', H, and H', the flier C, carrying the pinion P, spools K and L, cutters O O and N N, and barb-wire feed, the slides E' E', having thereon the holders $h\ h$, the levers F', F', U, and U', the block S' and T, and feed for drawing out the cable intermittingly, for the purposes set forth.

NOBLE G. ROSS.
THOMAS D. ROSS.

Witnesses as to signature of Noble G. Ross:
F. F. WARNER,
SAMUEL M. HENDERSON.

Witnesses as to signature of Thomas D. Ross:
LUTHER PENSIUR,
CHAS. LUCAS.